United States Patent [19]
Furuya

[11] Patent Number: 5,181,993
[45] Date of Patent: Jan. 26, 1993

[54] PROCESS FOR CONVERTING FERROUS IONS TO FERRIC IONS

[75] Inventor: Nagakazu Furuya, 4-3-31, Ohte 2-Chome, Kofu-shi, Yamanashi, Japan

[73] Assignees: Nagakazu Furuya; Tanaka Kikinzoku Kogyo K.K., Japan

[21] Appl. No.: 757,477

[22] Filed: Sep. 10, 1991

Related U.S. Application Data

[63] Continuation-in-part of Ser. No. 410,582, Sep. 21, 1989, Pat. No. 5,071,516.

[30] Foreign Application Priority Data

Sep. 22, 1988 [JP] Japan ............................ 63-238595
Sep. 28, 1988 [JP] Japan ............................ 63-243675
May 13, 1989 [JP] Japan ............................ 1-120133

[51] Int. Cl.$^5$ ........................... C25B 1/00; C25B 1/02
[52] U.S. Cl. ................................. 204/86; 204/129
[58] Field of Search ............................. 204/86, 129

[56] References Cited

U.S. PATENT DOCUMENTS

| | | | |
|---|---|---|---|
| 2,835,632 | 5/1958 | Kollsman | 204/86 X |
| 3,103,473 | 9/1963 | Juda | 204/86 X |
| 3,124,520 | 3/1964 | Juda | 204/86 |
| 4,435,256 | 3/1984 | Deininger | 204/86 |
| 4,435,257 | 3/1984 | Deininger et al. | 204/86 |
| 4,451,338 | 5/1984 | Deininger et al. | 204/86 |

Primary Examiner—Donald R. Valentine
Attorney, Agent, or Firm—Klauber & Jackson

[57] ABSTRACT

Enclosed herein is an apparatus for converting an ionic valence number which comprises a gas permeable membrane comprising a catalyst-supporting reaction layer and a hydrophobic gas permeable layer having fine pores; a solution chamber retaining an aqueous solution containing an ion, and the respective supply port and discharge port for the supply and the discharge of the aqueous solution containing the ion, which are located on the reaction layer side of the gas permeable membrane; and a gas chamber retaining an oxidizing gas or a reducing gas, and the respective supply port and discharge port for the supply and the discharge of the oxidizing or reducing gas, which are located on the gas permeable layer side of the gas permeable membrane. Another aspect of the invention is process for converting a ionic valence number which comprises supplying an aqueous solution containing an ion to the reaction layer side of a gas permeable membrane formed by joining a catalyst-supporting reaction layer with a gas permeable layer; supplying an oxidizing or a reducing gas to the gas permeable side; and converting the valence number of the ion in the aqueous solution containing the said ion.

5 Claims, 1 Drawing Sheet

PROCESS FOR CONVERTING FERROUS IONS TO FERRIC IONS

CROSS REFERENCE TO RELATED APPLICATIONS

This application is a continuation-in-part of U.S. application Ser. No. 410,582, now U.S. Pat. No. 5,071,516 filed on Sep. 21, 1989, copending herewith, priority of which is claimed hereunder.

BACKGROUND OF THE INVENTION

The present invention relates to a process for increasing or decreasing the valence number of an ion in a solution, and an apparatus therefor. The invention can be employed, for example, for converting a ferrous ion into a corresponding ferric ion and an uranyl ion into a corresponding uranous ion.

The present invention also relates to a process for obtaining a ferric salt and a hydrogen gas by electrolyzing a ferrous salt solution.

Conversion of the valence number of an ion in an aqueous solution has been heretofore carried out by a method of reacting the ion with an oxidizing agent or a reducing agent, or by a method of oxidizing or reducing the ion on an anode or on a cathode by means of electrolysis.

The method of reacting with the oxidizing agent or the reducing agent has the drawback that the oxidizing agent or the reducing agent added remains in the aqueous solution after the chemical reaction. The method of electrolyzing has the drawback that an anode chamber and a cathode chamber have to be separated by an ion exchange membrane.

The separation by means of the ion exchange membrane is necessary because the ion, for example, reduced on the cathode is oxidized on the anode to return its initial state.

Another method which consists of directly bubbling an oxidizing gas or a reducing gas into the aqueous solution is known, and is employed, for example, oxidizing a ferrous ion to a ferric ion with blowing a chlorine gas into the ferrous chloride solution while heating the solution at 60° to 70° C., but the reaction efficiency of this method is insufficient and the method is not economical.

The present invention in particular, addresses a process for preparing a ferric chloride solution from a ferrous chloride solution by means of electrolysis. Oxidation can be easily performed employing a gas permeable electrode at the hydrogen evolving side and a titanium electrode coated with platinum or a carbon electrode at the counter electrode side. Even if the voltage is increased for promoting oxidation, electrolysis efficiency is elevated without a rise in the bath voltage because the gas permeable electrode is employed as the hydrogen evolving electrode. Moreover, the hydrogen gas is easily discharged. The applications can thus be broadened utilizing the characteristics of the ferric chloride solution.

One useful example thereof is a process for contacting ferric chloride solution which is employed with poisonous hydrogen sulfide gas in a petroleum refining plant. A solution containing ferrous chloride and hydrogen chloride after the filtration of sulfur can be circulated and utilized by converting the ferrous chloride and the hydrogen chloride into ferric chloride and hydrogen according to the present invention.

SUMMARY OF THE INVENTION

Accordingly, it is an object of the present invention to provide an apparatus for easily converting the valence number of an ion in a solution, that is, for easily oxidizing or reducing an ion in a solution.

It is another object of the invention to provide a process for easily converting the valence number of an ion.

It is a further object of the invention to provide a process for converting the valence number employing a gas permeable membrane or electrode in which electrolysis may be or may not be employed.

It is a still further object of the invention to oxidize or reduce an ion in a solution by means of an oxidizing gas or a reducing gas through a gas permeable membrane or a gas permeable electrode.

A further object of the present invention is to provide a process for obtaining ferric chloride which comprises electrolyzing a ferrous chloride solution containing hydrochloric acid while employing a gas permeable electrode as a hydrogen evolving electrode, said gas permeable electrode not being affected by changes of the concentration of the ferrous salt.

The present invention thus encompasses a process for electrolyzing a ferrous salt which comprises electrolyzing a ferrous salt solution containing hydrochloric acid while employing a gas permeable electrode as a hydrogen gas evolving electrode and an insoluble electrode as the counter electrode, thus forming hydrogen gas and a ferric salt.

The most characteristic feature of the invention is in that, in converting the valence number of an ion in a solution, the ion is oxidized or reduced by contacting the ion with an oxidizing gas or a reducing gas through a gas permeable electrode or membrane comprising a catalyst-supporting reaction layer and a hydrophobic gas permeable layer.

DETAILED DESCRIPTION OF THE INVENTION

Figure 1:
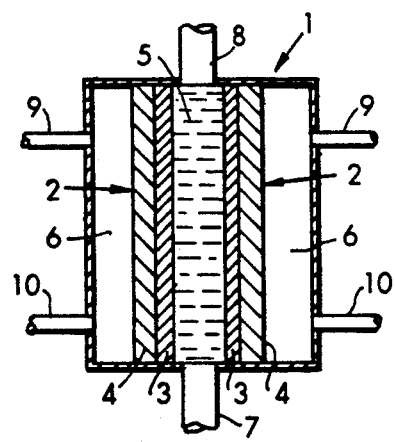
FIG. 1 is a schematic view of an apparatus for converting an ionic valence number.

The apparatus of this invention is one for converting an ionic valence number which comprises a gas permeable membrane or a gas permeable electrode comprising a catalyst-supporting reaction layer and a hydrophobic gas permeable layer having fine pores; a solution chamber retaining a solution containing an ion, and the respective supply port and discharge port for the supply and the discharge of the solution containing the ion, which are located on the reaction layer side of the gas permeable membrane or electrode; and a gas chamber retaining an oxidizing gas or a reducing gas, and the respective supply port and discharge port for the supply and the discharge of the oxidizing or reducing gas, which are located on the gas permeable layer side of the gas permeable membrane or electrode; the gas permeable membrane or electrode is formed by joining the reaction layer comprising catalyst-supporting hydrophilic carbon particles or catalyst particles, hydrophobic carbon particles and fluorine-containing resin, with the gas permeable layer comprising hydrophobic carbon particles and fluorine-containing resin such as polytetrafluoroethylene (hereinafter referred to as "PTFE"); and a more effective converting apparatus of an ionic valence number may be provided by equipping a porous electrode material having electroconductivity and corrosion-resistance in the solution chamber.

A process of the invention is a process for converting, by employing the above-mentioned apparatus, an ionic valence number which comprises supplying a solution containing an ion to the reaction layer side of a gas permeable membrane or electrode formed by joining a catalyst-supporting reaction layer with a gas permeable layer; supplying an oxidizing or a reducing gas to the gas permeable side; and converting the valence number of the ion in the solution containing the said ion; and a more effective converting process of an ionic valence number may be provided by making the pressure of the solution containing the ion higher than that of the oxidizing or the reducing gas.

When an ion in a solution is oxidized or reduced with a gas, the ion have to get in contact with the gas. In order to perform the effective contact between the ion and the gas, a gas permeable electrode or membrane is employed in the invention in which the ion and the gas are in intimate contact with each other to react sufficiently.

The apparatus for carrying out this reaction is required to have two chambers separated by the gas permeable membrane or electrode, one of which is a gas chamber for retaining the above oxidizing or reducing gas, the other of which is a solution chamber for retaining the solution containing the ion to be oxidized or reduced.

The solution containing the ion permeates into the reaction layer of the gas permeable membrane or electrode from the solution chamber while the gas penetrates into the gas permeable layer. The ion and the gas sufficiently contact in the gas permeable membrane or electrode so that the ion is oxidized or reduced. The ion is taken out from the solution chamber and no residue remains in the apparatus.

In carrying out this reaction, current may or may not flow, that is, the reaction can take place as electrolysis or as a normal oxidation or reduction reaction.

The gas permeable membrane or electrode is formed by joining the reaction layer and the gas permeable layer. For example, the reaction layer of which a thickness is 0.1 to 0.2 mm is prepared by mixing hydrophobic carbon black and hydrophilic carbon black of which mean particle sizes are 480 Å, PTFE of which a mean particle size is 0.3 $\mu$m and solvent naphtha as a solvent in the ratio of 7:4:4:20 and a proper amount of catalyst, compression-molding the mixed materials, and heating and drying at 280° C. for removing the solvent. For example, the gas permeable layer of which a thickness is 0.4 to 0.6 mm is prepared by mixing hydrophobic carbon black of which a mean particle size is 460 Å, PTFE of which a mean particle size is 0.3 $\mu$m and solvent naphtha as a solvent in the ratio of 6.5:3.5:18, compression-molding the mixed materials, and heating and drying at 280° C. for removing the solvent. Since, in the reaction layer of the gas permeable membrane thus prepared, the catalyst-supporting hydrophilic carbon particles, the hydrophobic carbon particles and PTFE are finely admixed, and the solution containing the ion penetrates into the portions of the catalyst-supporting hydrophilic carbon particles, and the oxidizing or the reducing gas permeates into the hydrophobic portion of the hydrophobic carbon particles and PTFE, the reaction gas can exist in the neighborhood of the wet catalyst after the solution containing the ion permeates into it so that a localized cell reaction occurs with the electrode surface area participated in the reaction being more than 500 times larger than it appears, and the converting rate of the ionic valence number can be remarkably faster.

The porosity of the gas permeable layer is preferably more than 60%, the layer having hydrophobic fine pores of not more than 0.1 $\mu$m. While the oxidizing or the reducing gas can penetrate into the pores, the permeation of the solution containing the ion is depressed.

For example, when a hydraulic pressure of 20 kg/cm$^2$ is applied to the reaction layer side of the gas permeable membrane, no water leaks to the outer surface of the gas permeable layer. However, the reaction gas is easily supplied from the gas permeable layer to the reaction layer.

The conversion efficiency of ionic valence number can be elevated by equipping the porous electrode material having electroconductivity and corrosion-resistance in the solution chamber for retaining the solution containing the ion, increasing the surface area required for the conversion of the ionic valence number by means of the electrical connection with the reaction layer, and making the flow of the solution irregular.

As the porous electrode material, a platinum mesh, carbon fiber, porous titanium expand material supported with platinum and the like can be employed.

The catalyst supported on the reaction layer of the gas permeable membrane or electrode can be selected among electrocatalysts which include such a precious metal element as platinum, palladium, iridium, rhodium, ruthenium and the like, their alloys, their oxides and so on. The reaction gas can be selected among hydrogen, oxygen, chlorine and the like, depending on the catalyst selected and the chemical reaction of the subject ion of which a valence number is converted.

In order to enhance the conversion rate of the valence number of the ion is the solution by means of the apparatus of this invention, a plurality of the apparatuses of this invention may be employed by connecting them in series or in parallel.

The apparatus may also be a cylindrical form, and the solution containing the ion and the oxidizing or the reducing reaction gas can be employed in the mixed phase flow state in the vessel equipped with the gas permeable membrane.

Conversion of an ionic valence number can be performed by means of the remarkably simple apparatus or the process which comprises employing the gas permeable membrane or electrode comprising the reaction layer supported with the catalyst and the hydrophobic gas permeable layer, penetrating the solution containing the ion into the reaction layer and supplying the oxidizing or the reducing gas from the gas permeable layer side. The conventional electrolysis process has such disadvantages that supply of electric energy and use of an ion exchange membrane are indispensable and the like. The process for converting an ionic valence number by adding an oxidizing agent or a reducing agent has such a drawback that the oxidizing agent or the reducing agent remains as impurities. According to the apparatus and the process of the present invention, however, the above disadvantages can be overcome at a stroke so that the present invention is epoch-making and largely contributes to the progress of the industry.

FIG. 1 shows one example of the apparatus of converting an ionic valence number without current flow.

An apparatus 1 of converting an ionic valence number consists of a gas permeable membrane 2 comprising a catalyst-supporting reaction layer 3 and a hydrophobic gas permeable layer 4 having fine pores not more than 1 $\mu$m; a solution chamber 5 retaining an aqueous solution containing an ion, and the respective supply port 7 and discharge port 8 for the supply and the discharge of the aqueous solution containing the ion, which are located on the reaction layer side of the gas permeable membrane; and a gas chamber 6 retaining an oxidizing gas or a reducing gas, and the respective supply port 9 and discharge port 10 for the supply and the discharge of the oxidizing or reducing gas, which are located on the gas permeable layer side of the gas permeable membrane.

Figure 2:
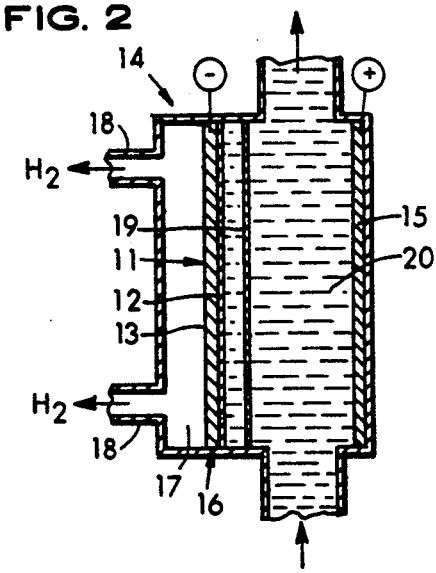
FIG. 2 is a schematic view of another apparatus especially suitable for converting a ferrous salt into a ferric salt.

FIG. 2 is a schematic view of an electrolytic apparatus in which a gas permeable electrode is employed as a hydrogen gas evolving electrode especially suitable for oxidizing a ferrous salt to a ferric salt.

The gas permeable electrode 11 is a membrane-like member having two layers of a reaction layer 12 and a gas permeable layer 13. The reaction layer 12 is, for example, prepared by compress-molding a mixture and thereafter heating and drying the mixture for solvent removal at 280° C. The mixture may consist of hydrophobic carbon black and hydrophilic carbon black of 420 Å of a mean particle polytetrafluoroethylene. PTFE of 0.3 $\mu$m of a mean particle size and solvent naphtha as a solvent in the mixing ratio of 7:4:4:20 and platinum black of 250 Å of a mean particle size which is added and supported so that the surface concentration thereof is 0.56 mg/cm$^2$ when the mixture is molded to a membrane of which a thickness is 0.1 mm.

The major part of the reaction layer 12 may be composed of carbon black for providing electroconductivity as an electrode.

The hydrophilic carbon black is employed for forming penetrating paths of an electrolyte and the hydrophobic carbon black is employed for forming gas permeating paths without impairing the electrode performance. PTFE is added as constituting material and a binding agent of the gas permeating paths.

The platinum is uniformly dispersed, and is employed for promoting an oxidation-reduction reaction and for producing electroconductivity.

The gas permeable layer 13 is a membrane having hydrophobic pores all of which are not more than 0.1 $\mu$m. The layer 13 is prepared, for example, by molding a mixture to a thickness of 0.5 mm and thereafter heating and drying the mixture for solvent removal at 280° C. The mixture may consist of hydrophobic carbon black of 420 Å of a mean particle size, PTFE of 0.3 $\mu$m of a mean particle size and solvent naphtha as a solvent in the mixing ratio of 7:3:18.

The hydrophobic carbon black and PTFE are employed in the gas permeable layer 13 for preventing electrolyte leakage.

The layer has preferably fine pores for promoting the efficiency of gas passage.

The gas permeable electrode 11 is formed by joining the above-mentioned reaction layer 12 and the gas permeable layer 13, and the gas permeable electrode 11 may be reinforced. For example, the gas permeable electrode 11 may be fixed by interposing the electrode 11 between two-metal-meshes covered with resin which is resistant to hydrochloric acid and iron oxide.

The electrolytic apparatus 14 has an anode 15, and a gas chamber 17 and a gas discharge port 18 at the hydrogen evolving electrode 16 side. A diaphragm 19 is located between the anode 15 and the hydrogen evolving electrode 16, and an electrolyte 20 can flow between the diaphragm 19 and the anode 15.

An electrode which is prepared by covering titanium, tantalum substrate or the like with a platinum group metal or its oxide, or a carbon electrode made of carbon fiber or porous carbon may be employed as the anode 15. The hydrogen evolving electrode 16 is equipped so that the surface being contact with the electrolyte is the reaction layer 12.

Figure 3:
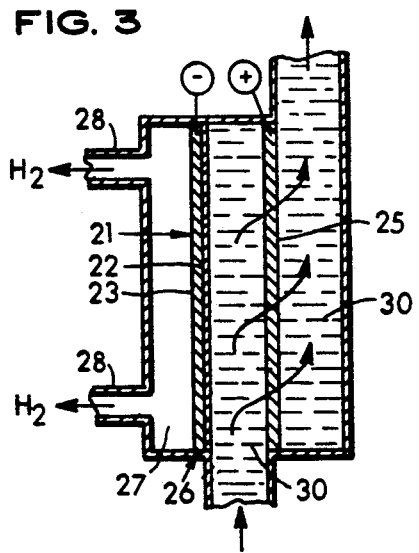
FIG. 3 is a schematic view of still another apparatus suitable for converting a ferrous salt into a ferric salt.

FIG. 3 is a schematic view of another electrolytic apparatus when carbon felt is employed as an anode. An electrolyte 20 which is a ferrous chloride solution is introduced from a lower port and is passed through the anode 25 which may be composed of the carbon-felt fiber, the ferrous ion being oxidized into a ferric ion at that time. In this case, successive oxidation can be achieved by controlling the flow of the ferrous salt and the current density without employing a separator.

The electrolyte 30 is composed of the ferrous salt, hydrogen chloride and water. The ferrous salt and the hydrogen chloride are preferably the same molar concentration and the electrolysis voltage may be 0.8V to 1.2V. The ferrous ion in the electrolyte 30 is oxidized on the anode 25 and converted into a ferric ion, and at the hydrogen evolving electrode 26 side the hydrogen ion is reduced to a hydrogen gas in the reaction layer 22 of the gas permeable electrode 21, the hydrogen gas moving through the gas permeable layer 23 to the gas chamber 27 and being discharged through the gas discharge port 28.

The rise of the bath voltage caused by the hydrogen gas evolved when the higher voltage is applied for promoting the electrolytic oxidation rate can be overcome by employing the gas permeable electrode.

The electrolysis voltage which is required for oxidizing the ferrous ion to the ferric ion while evolving the hydrogen gas is 0.77V at the normal condition. The hydrogen gas discharged may be utilized in many uses.

In order not to evolve the hydrogen gas for lowering the electrolysis voltage, an oxygen gas may be supplied through the gas discharge port 28 so that a voltage lowering of about 0.7V can be estimated in the actual electrolysis conditions. This is a method preferably employed when the hydrogen gas is unnecessary.

Figure 4:
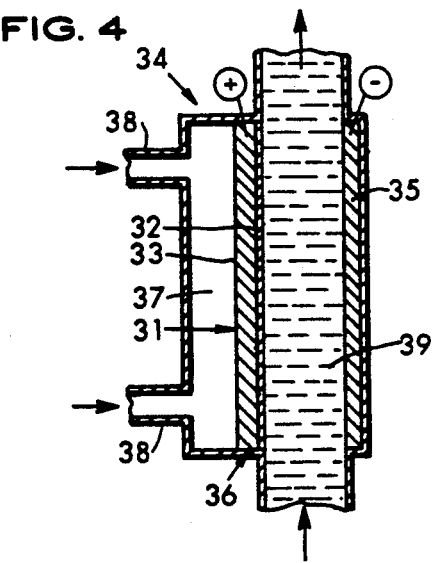
FIG. 4 is a schematic view of still another apparatus suitable for converting an uranyl salt into an uranous salt.

FIG. 4 is a schematic view of still another electrolytic apparatus when a gas permeable electrode is employed as an anode especially suitable for reducing an uranyl ion to an uranous ion. The gas permeable electrode 31 formed by a reaction layer 32 and a gas permeable layer 33 is the same as that described in FIG. 2.

The electrolytic apparatus 34 has a cathode 35, and a gas chamber 37 and a gas supply port 38 at the anode 36 side. An electrolyte 39 can flow between the cathode 35 and the anode 36.

A titanium electrode may be employed as the cathode 35, and the anode 36 is equipped so that the surface of the anode in contact with the electrolyte is the reaction layer of the gas permeable electrode. The interelectrode distance may be as close as several millimeters.

The electrolyte may be composed of the uranyl salt, an acid and water. The concentration of the uranyl salt is preferably 100 g/l as uranium and that of the acid is preferably 55 to 80 g/l. A hydrogen gas may be supplied through the gas supply port 38 during the electrolytic reduction to depolarize the anode.

The hydrogen gas supplied is introduced to the gas chamber 37 to pass through the gas permeable layer 33 of the gas permeable electrode to penetrate into the reaction layer 32 so as to be reacted with an oxygen ion to form water. Therefore, the anode 36 can be depolarized without formation of the oxygen gas.

An uranyl ion is reduced to an uranous ion on the cathode.

The reaction equation of the process according to the conventional method is expressed as Equation (1), while that according to the drawing is expressed as Equation (2).

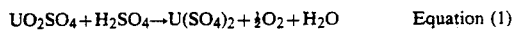  Equation (1)

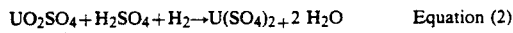  Equation (2)

Since no oxygen gas is evolved as shown above, the bath voltage can be reduced by about 2V. Further, lowering of the bath voltage can be achieved by employing no cation exchange membrane which has heretofore been employed as a diaphragm. The electrolysis can be performed without the diaphragm because the anode voltage is lowered so that no reoxidation of the uranous salt takes place.

By lowering the bath voltage, the current density which was heretofore 120 mA/cm$^2$ can be increased to follow the concentration change of the uranyl salt.

Although the Examples of the present invention will be hereinafter described, the invention is not restricted by these Examples.

EXAMPLE 1

Figure 5:
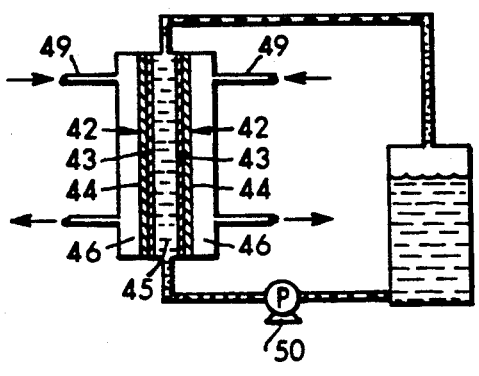
FIG. 5 is a schematic view of an apparatus employed in Example 1.

Uranyl nitrate was converted into urannous nitrate employing an apparatus of which construction is shown in FIG. 5.

The dimension of a gas permeable membrane 42 was 120 mm × 120 mm × 0.6 mm (thickness), the thickness of a reaction layer 43 was 0.1 mm and the thickness of a gas permeable layer 44 was 0.5 mm. As a platinum catalyst, 1.0 mg/cm$^2$ of platinum was supported on the reaction layer 43, and the distance between two sheets of the gas permeable membrane 42 opposed to each other in a solution chamber 45 was 2 mm.

As a solution containing an ion, 1.6 M/l of uranyl nitrate [$UO_2(NO_3)_2$], 3.9 M/l of a nitric acid ($HNO_3$) solution and a solution containing 0.3 M/l of hydrazine were supplied to the solution chamber 45 and circulated by means of a pump 50. From the gas supply ports 49 of the respective gas chambers 46, a hydrogen gas was supplied at the rate of 0.1 l/min. After 60 minutes, 96% of the uranyl nitrate in the reserve tank was converted into uranus nitrate. The reaction according to this procedure is as follows.

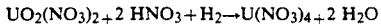

While this reaction system can provide a cell of which electromotive force $E_0 = 0.33V$, a localized cell formed in the reaction layer 43 of the gas permeable membrane 42 makes it possible to reduce the uranyl ion to the uranus ion.

CONVENTIONAL EXAMPLE

An apparatus employing a plate-like cathode and a platinum anode which were separated by a cation exchange membrane (Nafion 117) was employed. 2 M/l of uranyl nitrate and 3 M/l of sulfuric acid were supplied as a catholyte and an anolyte, respectively. After electrolysis was carried out at an electrolysis voltage of 5.0V for 28 minutes, 85% of the uranyl nitrate in the cathode chamber was converted into uranous nitrate and oxygen was evolved on the anode.

EXAMPLE 2

After electrolysis was carried out for 45 minutes supplying 2M of ferrous sulfate ($FeSO_4$) and 1.5M of a sulfuric acid ($H_2SO_4$) solution to a solution chamber 5 as an electrolyte of FIG. 1, and an oxygen gas to a gas chamber 6 at 0.1 l/min., respectively, 98% of the ferrous sulfate in a reservoir was converted into ferric sulfate.

The reaction according to this operation can be expressed as follows.

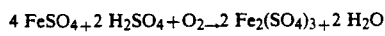

EXAMPLE 3

Figure 6:
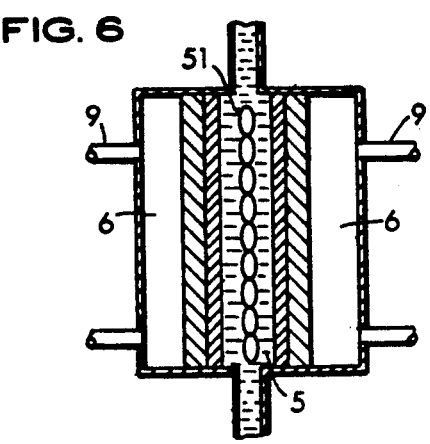
FIG. 6 is a schematic view of an apparatus employed in Example 3.

Electrode material 51 of which length, width and thickness were 95 mm, 95 mm and 10 mm, respectively, and which had been prepared by plating platinum on a titanium expander was equipped in the solution chamber 5 of the apparatus employed in Example 1 as shown in FIG. 6. After a solution similar to that of Example 1 containing uranyl nitrate and nitric acid was supplied and circulated for 20 minutes with supplying a hydrogen gas at 0.2 l/min. through the respective gas supply ports 9 of the gas chambers 6, 97% of the uranyl nitrate in a reservoir was converted into urannous nitrate.

EXAMPLE 4

After electrolysis was carried out for 15 minutes employing the apparatus the same as that of Example 3, supplying a solution similar to that of Example 2 containing ferrous sulfate and sulfuric acid to the solution chamber 5 and supplying an oxygen gas at 0.2 l/min. to the gas chamber 6, 86% of the ferrous sulfate was converted into ferric sulfate.

EXAMPLE 5

After the operation was carried out in the same manner as that of Example 3 except that the pressure of the solution chamber 5 was 3.0 kg/cm$^2$ and the pressure of the gas chamber 6 was 2.5 kg/cm$^2$ for 14 minutes, 96% of the uranyl nitrate was converted into uranous nitrate.

EXAMPLE 6

After the operation was carried out in the same manner as that of Example 4 except that the pressure of the solution chamber 5 was 3.0 kg/cm$^2$ and the pressure of the gas chamber 6 was 2.5 kg/cm$^2$ for 11 minutes, 85% of the ferrous sulfate was converted into the ferric sulfate.

EXAMPLE 7

After the operation was carried out for 34 minutes in the same manner as that of Example 1 employing the same apparatus as that of Example 1, supplying a solution containing 1.5M of stannic chloride and 3M of hydrochloric acid to the solution chamber 5 and supplying a hydrogen gas to the gas chamber 6, 96% of the stannic chloride was converted into stannous chloride.

EXAMPLE 8

After the operation was carried out for 30 minutes in the same manner as that of Example 2 employing the same apparatus as that of Example 2, supplying a solution containing 1.5M of cuprous chloride and 2M of hydrochloric acid to the solution chamber 5 and supplying an oxygen gas to the gas chamber 6, 98% of the cuprous chloride was converted into cupric chloride.

EXAMPLE 9

A gas permeable membrane was press-molded into a semicircular shape of which thickness was 5 mm. The membrane was packed into a pipe made of acryl resin of 5 cm inner diameter so that the height of the membrane was 10 cm. A solution containing ferric sulfate and sulfuric acid was introduced into the pipe with supplying a hydrogen gas from a lower port. After the ten minutes' hydrogen blowing, almost 100% of the ferric sulfate was converted into ferrous sulfate.

EXAMPLE 10

After a hydrogen gas was bubbled for ten minutes through a solution containing 0.01M of copper sulfate in a similar apparatus to that of Example 9, the copper sulfate was precipitated on the gas permeable membrane so that the copper sulfate concentration was made to not more than 1 ppm. Thereafter, the precipitated copper on the gas permeable membrane was easily converted into copper sulfate by bubbling an oxygen gas therethrough. Concentration of ions can be performed by means of this process.

EXAMPLE 11

After a solution containing 2 mol/l of ferric chloride which had been contacted with hydrogen sulfide was filtered to remove precipitated sulfur, the solution was analyzed to contain 2 mol/l of ferrous chloride and 2 mol/l of hydrogen chloride.

The electrolysis at the constant voltage was carried out employing this solution as an electrolyte at the voltage of 1.0V and at the interelectrode distance of 10 mm.

The electrolyte after the electrolysis was analyzed so that the concentration of the ferric chloride was 2 mol/l.

From the gas discharge port, 4 l of the hydrogen gas could be obtained.

The dimension of the gas permeable electrode employed was 10 cm×10 cm, and a lath electrode plated with platinum of which dimension was 10 cm×10 cm was employed as an anode.

EXAMPLE 12

The electrolysis was carried out in the same manner as that of Example 11 except that a carbon electrode was employed as an anode instead of the lath electrode. The same results as those of Example 11 were obtained.

EXAMPLE 13

The electrolysis was carried out in the same manner as that of Example 11 except that the electrolysis voltage was 0.95V. The same results as those of Example 11 were obtained.

EXAMPLE 14

After an aqueous solution containing 0.5 mol/l of ferrous chloride and 0.8 mol/l of hydrogen chloride was electrolyzed in the same conditions as those of Example 11, an aqueous solution containing 0.5 mol/l of ferric chloride and 0.3 mol/l of hydrogen chloride was obtained.

EXAMPLE 15

Electrolysis was carried out employing an aqueous solution containing uranyl sulfate (containing 100 g/l as uranium) and 80 g of sulfuric acid as an electrolyte, a titanium plate of 100 mm×100 mm as a cathode and a platinum-supported gas permeable electrode of 100 mm×100 mm as an anode with an interelectrode distance of 10 mm at current density of 150 mA/cm$^2$. The bath voltage was 0.5V.

The current efficiency was 70%.

A hydrogen gas was supplied at the pressure of 1.1 kg/cm$^2$.

EXAMPLE 16

Electrolysis was carried out employing an aqueous solution containing uranyl chloride (containing 100 g/l as uranium) and 60 g of hydrochloric acid as an electrolyte, a titanium plate of 100 mm×100 mm as a cathode and a platinum-supported gas permeable electrode of 100 mm×100 mm as an anode with an interelectrode distance of 10 mm at current density of 140 mA/cm$^2$. The bath voltage was 0.56V.

The current efficiency was 80%.

A hydrogen gas was supplied at the pressure of 1.1 kg/cm$^2$.

In Examples 11 through 14 above, the ferrous chloride may be replaced with another suitable ferrous salt, e.g., ferrous sulfate.

What is claimed is:

1. A process for converting ferrous ions to ferric ions comprising:
   supplying a solution containing ferrous ions to the reaction layer side of a gas permeable membrane or electrode formed by joining a catalyst-supporting reaction layer with a gas permeable layer, the pressure of the solution containing ferrous ions being greater than that of the oxidizing gas;
   supplying an oxidizing gas to the gas permeable side of the membrane, and converting the ferrous ions to ferric ions in solution.

2. A process according to claim 1, wherein the ferrous ions are supplied in the form of ferrous chloride or ferrous sulfate.

3. A process for producing ferric ions comprising electrolyzing a solution containing ferrous ions and hydrochloric acid in the presence of a gas permeable electrode and an insoluble counterelectrode for a time period and at a voltage which are effective for converting ferrous ions to ferric ions and for forming hydrogen gas.

4. A process according to claim 3, wherein the voltage which is effective for converting ferrous ions to ferric ions is in the range of 0.8V to 1.2V.

5. A process according to claim 3, wherein the initial concentration of ferrous ions is about 0.5M.

* * * * *